(12) United States Patent
Lammers et al.

(10) Patent No.: US 9,099,882 B2
(45) Date of Patent: Aug. 4, 2015

(54) TURBINE ENGINE HYBRID POWER SUPPLY

(71) Applicant: Caterpillar Inc., Peoria, IL (US)

(72) Inventors: Bryan Gerard Lammers, Peoria Heights, IL (US); Daniel Edward Henderson, Roanoke, IL (US); James Allen Roal, Dunlap, IL (US); Jackson Wai, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 328 days.

(21) Appl. No.: 13/745,228

(22) Filed: Jan. 18, 2013

(65) Prior Publication Data
US 2014/0203760 A1 Jul. 24, 2014

(51) Int. Cl.
*B60W 20/00* (2006.01)
*H02J 7/00* (2006.01)

(52) U.S. Cl.
CPC .............. *H02J 7/007* (2013.01); *B60W 20/10* (2013.01); *B60W 20/108* (2013.01); *B60W 20/1088* (2013.01); *Y02T 10/44* (2013.01); *Y02T 10/48* (2013.01); *Y02T 10/50* (2013.01); *Y02T 10/52* (2013.01); *Y02T 10/62* (2013.01); *Y02T 10/6204* (2013.01); *Y02T 10/6213* (2013.01); *Y02T 30/36* (2013.01)

(58) Field of Classification Search
CPC ..... Y02T 10/6204; Y02T 10/62; Y02T 10/44; Y02T 10/48; Y02T 10/50; Y02T 10/52; Y02T 10/6213; Y02T 30/36; B60W 20/10; B60W 20/1088; B60W 20/108
USPC ........ 320/104, 107; 180/165, 65.265, 65.275, 180/65.28, 65.285, 65.29, 65.231
See application file for complete search history.

(56) References Cited

U.S. PATENT DOCUMENTS

| | | | | |
|---|---|---|---|---|
| 4,157,011 A | * | 6/1979 | Liddle | 60/39.27 |
| 4,199,037 A | | 4/1980 | White | |
| 4,311,917 A | | 1/1982 | Hencey et al. | |
| 4,454,463 A | * | 6/1984 | Popescu | 322/4 |
| 4,499,965 A | * | 2/1985 | Oetting et al. | 180/165 |
| 5,285,634 A | | 2/1994 | Hoff et al. | |
| 5,487,002 A | * | 1/1996 | Diller et al. | 701/1 |
| 5,762,156 A | * | 6/1998 | Bates et al. | 180/165 |
| 5,783,932 A | | 7/1998 | Namba et al. | |
| 6,054,838 A | | 4/2000 | Tsatsis | |
| 6,213,234 B1 | | 4/2001 | Rosen et al. | |
| 7,444,944 B2 | | 11/2008 | Kumar et al. | |

(Continued)

FOREIGN PATENT DOCUMENTS

EP 0414535 2/1991

*Primary Examiner* — Stacy Whitmore
(74) *Attorney, Agent, or Firm* — Finnegan, Henderson, Farabow, Garrett & Dunner, LLP

(57) ABSTRACT

A method for controlling a hybrid machine is disclosed. The hybrid machine may be equipped with a turbine engine, a generator connected in series with the turbine engine, an electrical energy storage device, and a motor drivingly connected to a power output component for the hybrid machine. A controller may receive a power demand signal, determine a power level in the electrical energy storage device, determine available inertial energy stored at least in rotating components of the turbine engine and the generator, and provide one or more control signals to selectively control powering the turbine engine to full power, selectively turn off all fuel to the turbine engine, selectively store excess energy as electrical energy by directing excess electrical energy from the generator to the electrical energy storage device, and selectively store excess energy as inertial energy.

20 Claims, 4 Drawing Sheets

(56) References Cited

U.S. PATENT DOCUMENTS

| | | | |
|---|---|---|---|
| 8,104,560 B1* | 1/2012 | Huang | 180/165 |
| 8,914,180 B2* | 12/2014 | Holmes et al. | 701/22 |
| 2002/0007975 A1* | 1/2002 | Naito et al. | 180/65.3 |
| 2005/0090365 A1* | 4/2005 | Tamai et al. | 477/5 |
| 2006/0046894 A1 | 3/2006 | Kyle | |
| 2006/0208570 A1* | 9/2006 | Christian et al. | 307/10.1 |
| 2008/0105475 A1* | 5/2008 | Hu | 180/65.1 |
| 2008/0122228 A1* | 5/2008 | Liu et al. | 290/40 |
| 2008/0224478 A1* | 9/2008 | Tamor | 290/40 |
| 2008/0276898 A1* | 11/2008 | Wang et al. | 123/192.2 |
| 2009/0182466 A1* | 7/2009 | Watanabe et al. | 701/29 |
| 2009/0227409 A1* | 9/2009 | Ito et al. | 475/5 |
| 2010/0082192 A1* | 4/2010 | Hofbauer | 701/22 |
| 2010/0107632 A1* | 5/2010 | Wu et al. | 60/608 |
| 2010/0193270 A1* | 8/2010 | Deshaies et al. | 180/65.265 |
| 2010/0251726 A1 | 10/2010 | Jones et al. | |
| 2010/0314186 A1* | 12/2010 | Ma | 180/165 |
| 2011/0024216 A1* | 2/2011 | Angeletti | 180/165 |
| 2011/0114406 A1* | 5/2011 | Gibson et al. | 180/165 |
| 2011/0154805 A1 | 6/2011 | Heathco et al. | |
| 2012/0197472 A1* | 8/2012 | He et al. | 701/22 |
| 2012/0292918 A1* | 11/2012 | Bichler et al. | 290/1 R |
| 2012/0309575 A1* | 12/2012 | Buffet | 475/5 |
| 2013/0002207 A1* | 1/2013 | Wenger | 320/152 |
| 2013/0042617 A1* | 2/2013 | Atkins et al. | 60/698 |
| 2013/0081498 A1* | 4/2013 | Serkh et al. | 74/433.5 |
| 2013/0119665 A1* | 5/2013 | Berbari | 290/50 |
| 2013/0139515 A1* | 6/2013 | Schlak | 60/772 |
| 2013/0140882 A1* | 6/2013 | Agnew | 307/9.1 |
| 2013/0158838 A1* | 6/2013 | Yorke et al. | 701/103 |
| 2013/0168220 A1* | 7/2013 | Ho et al. | 200/600 |
| 2013/0169226 A1* | 7/2013 | Read | 320/109 |
| 2013/0211885 A1* | 8/2013 | Carpinteri | 705/14.1 |
| 2014/0035525 A1* | 2/2014 | Vossberg et al. | 320/109 |
| 2014/0094336 A1* | 4/2014 | Versteyhe et al. | 475/8 |
| 2014/0171260 A1* | 6/2014 | Dalum | 477/5 |
| 2014/0238340 A1* | 8/2014 | Dunn et al. | 123/299 |

* cited by examiner

TURBINE ENGINE HYBRID POWER SUPPLY

TECHNICAL FIELD

The present disclosure relates generally to a power supply and, more particularly, a turbine engine hybrid power supply.

BACKGROUND

There is a desire to reduce carbon-based emissions from today's power supplies, while at the same time improving the fuel efficiency of the power supplies. In addition to providing power supplies that can do more work per unit of fuel, it would also be advantageous if the power supplies were capable of deriving energy from a variety of different fuels. A reduction in the size of the power supplies would also be consistent with the goals of improving fuel efficiency and reducing emissions, particularly with mobile power supplies.

One problem associated with conventional power supplies is that the power supplies have the best efficiency when they are running close to or at rated conditions. However, during many applications the full rated power of the power supply is not needed, and the power supply is therefore run at power levels that result in the inefficient use of fuel by the power supply, or the power supply produces excess energy that is wasted.

One attempt to improve the efficiency of a hybrid vehicle is disclosed in U.S. Pat. No. 4,199,037 of White that issued on Apr. 22, 1980 (the '037 patent). The '037 patent provides an electrically-driven vehicle with a turbine engine, a generator driven by the turbine engine, a battery for storing electrical energy, and motors for driving wheels of the vehicle. The motors are powered by electrical energy that can be obtained directly from the generator or from the battery. A controller turns the turbine engine on whenever the amount of usable energy stored in the battery drops below a first predetermined level. The '037 patent also discloses maintaining the speed of the turbine at a constant level to maximize its efficiency.

Although the hybrid system of the '037 patent may improve the efficiency of the disclosed vehicle, it may be less than optimal. In particular, the disclosed hybrid system of the '037 patent does not provide any means for storing energy other than a battery. When the stored energy in the battery rises above a predetermined level, the turbine engine is shut off and the only source of energy becomes the battery until the turbine engine is turned back on to drive a DC generator and recharge the battery. As a result, the system of the '037 patent may not allow for operation of the turbine engine at its point of maximum efficiency, and may not be able to provide energy as rapidly as desired in some situations.

The system and method of the present disclosure solves one or more problems set forth above and/or other problems in the art.

SUMMARY

In one aspect, the present disclosure is directed to a turbine engine hybrid power supply. The hybrid power supply may include a turbine engine, a generator connected in series through a drive shaft with the turbine engine, an electrical energy storage device connected to receive electrical energy produced by the generator, and a controller connected to the turbine engine, the generator, and the electrical energy storage device. The controller may be configured to receive a power demand signal, determine a power level in the electrical energy storage device, determine available inertial energy stored at least in rotating components of the turbine engine and the generator, and provide one or more control signals to selectively control the performance of one or more functions. The functions may include selectively powering the turbine engine to full power, selectively turning off all fuel to the turbine engine, selectively directing excess electrical energy from the generator to the electrical energy storage device, and selectively storing excess energy as inertial energy.

In another aspect, the present disclosure is directed to a method of controlling a hybrid machine equipped with a turbine engine, a generator connected in series with the turbine engine, an electrical energy storage device, and a motor drivingly connected to a power output component for the hybrid machine. The method may include receiving a power demand signal, determining a power level in the electrical energy storage device, determining available inertial energy stored at least in rotating components of the turbine engine and the generator, and providing one or more control signals to selectively control the performance of one or more functions. The functions may include selectively powering the turbine engine to full power, selectively turning off all fuel to the turbine engine, selectively storing excess energy as electrical energy by directing excess electrical energy from the generator to the electrical energy storage device, and selectively storing excess energy as inertial energy.

DETAILED DESCRIPTION

Figure 1:
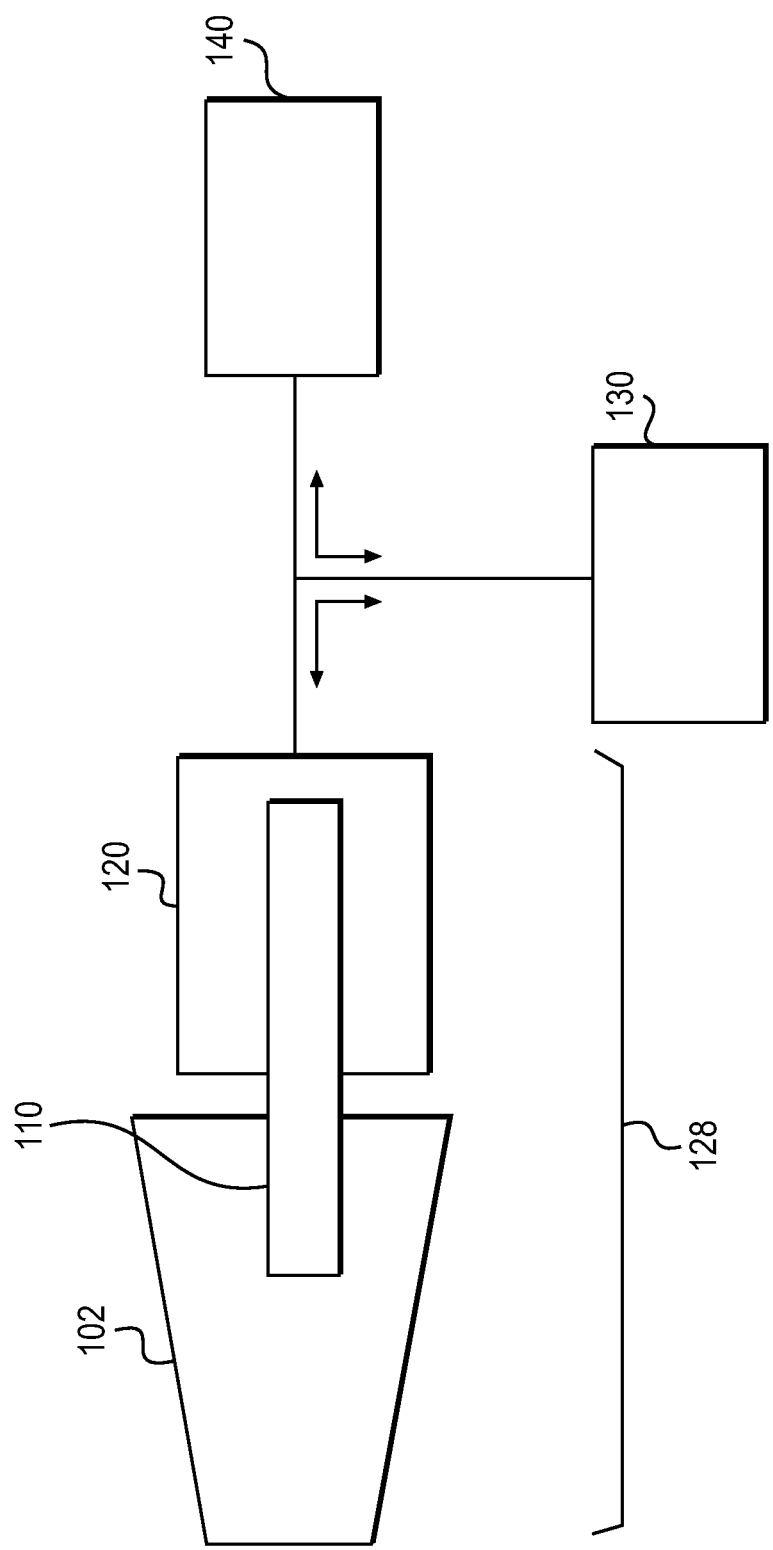
FIG. 1 is a schematic illustration of an exemplary disclosed turbine engine hybrid power supply.

Referring to FIG. 1, an exemplary implementation of a turbine engine hybrid power supply according to this disclosure may include a turbine-generator 128 that includes a turbine engine 102 mechanically coupled through a drive shaft 110 to a generator 120. Generator 120 may be electrically coupled to an electrical energy storage device 130, such as a bank of lithium-ion batteries. Generator 120 may be, for example, an AC induction generator, a permanent-magnet generator, an AC synchronous generator, or a switched-reluctance generator that is mechanically driven by turbine engine 102 to produce electrical power. In one implementation, generator 120 may include multiple pairings of poles (not shown), each pairing having three phases arranged on a circumference of a stator (not shown) to produce an alternating current. Electrical power produced by generator 120 may be electrically coupled to at least one electric motor 140, which may provide the driving torque to various power output components. These power output components may provide power for a variety of different applications. Such applications may include static power generation systems, such as for the power needs in a building, or power provided to wheels or other traction devices mounted on a vehicle, such as a train locomotive, earth-moving equipment, farming equipment, mining equipment, or heavy construction equipment. Additional power transmission devices such as gear boxes, continuously variable drives, and torque converters may also be provided to control transfer of mechanical energy from the at least one motor 140 to the power output components for imparting motion to a vehicle, meeting a static power output demand, or otherwise performing work.

During operation, the rotating components of turbine engine 102 and generator 120, such as rotating turbine blades, and the generator rotor, may reach speeds of 40,000 to 60,000 revolutions per minute (RPM) or higher, and may therefore store significant amounts of energy as rotational inertia. The turbine-generator spins freely as one rotational unit when fueled, and then may maintain that high speed rotation after the fuel supply is cut off for a significant period of time as a result of the high inertia of the rotating components in the turbine and the generator, and the relatively low friction losses experienced by the rotating components. As shown in FIG. 1, electrical power generated by generator 120 may be provided directly to one or more electric motors 140, or when the available stored energy in electrical energy storage device 130 has dropped below a first level, at least a portion of the electrical power generated by generator 120 may be stored in electrical energy storage device 130. Electrical energy stored in storage device 130 may in turn be supplied to generator 120 in order to cause generator 120 to act as a starter motor for turbine engine 102 when the rotational speed of turbine engine 102 has dropped below a certain threshold.

The turbine engine hybrid power supply according to various implementations of this disclosure stores energy that can be used to start turbine engine 102, and power the at least one electric motor 140 to impart motion to the vehicle or perform other desired work. The inertial energy stored in the high speed rotating components of turbine 102 and generator 120 may act as the primary energy storage mechanism, with this inertial energy being available to provide instant power when needed. The inertial energy storage capabilities of the rotating components of turbine-generator 128 may also be increased by the addition of one or more flywheels. Electrical energy storage device 130 may act as a secondary energy storage device, and may include batteries, capacitive devices, or other forms of electrical energy storage that can provide a longer term energy storage mechanism than the inertial energy storage of the rotating components. The inertial energy storage may allow for rapid storage of excess energy, such as may be obtained during regenerative or dynamic braking or when energy in excess of a power demand is produced by turbine engine 102. The inertial energy storage may also allow for a more rapid or instant access to energy than may be possible with electrical energy storage device 130. Electrical energy storage device 130, on the other hand, may allow for a larger capacity for longer term, steady-state energy storage, as well as providing the capability of longer term, steady-state energy supply than may be possible with the inertial energy storage.

Figure 2:
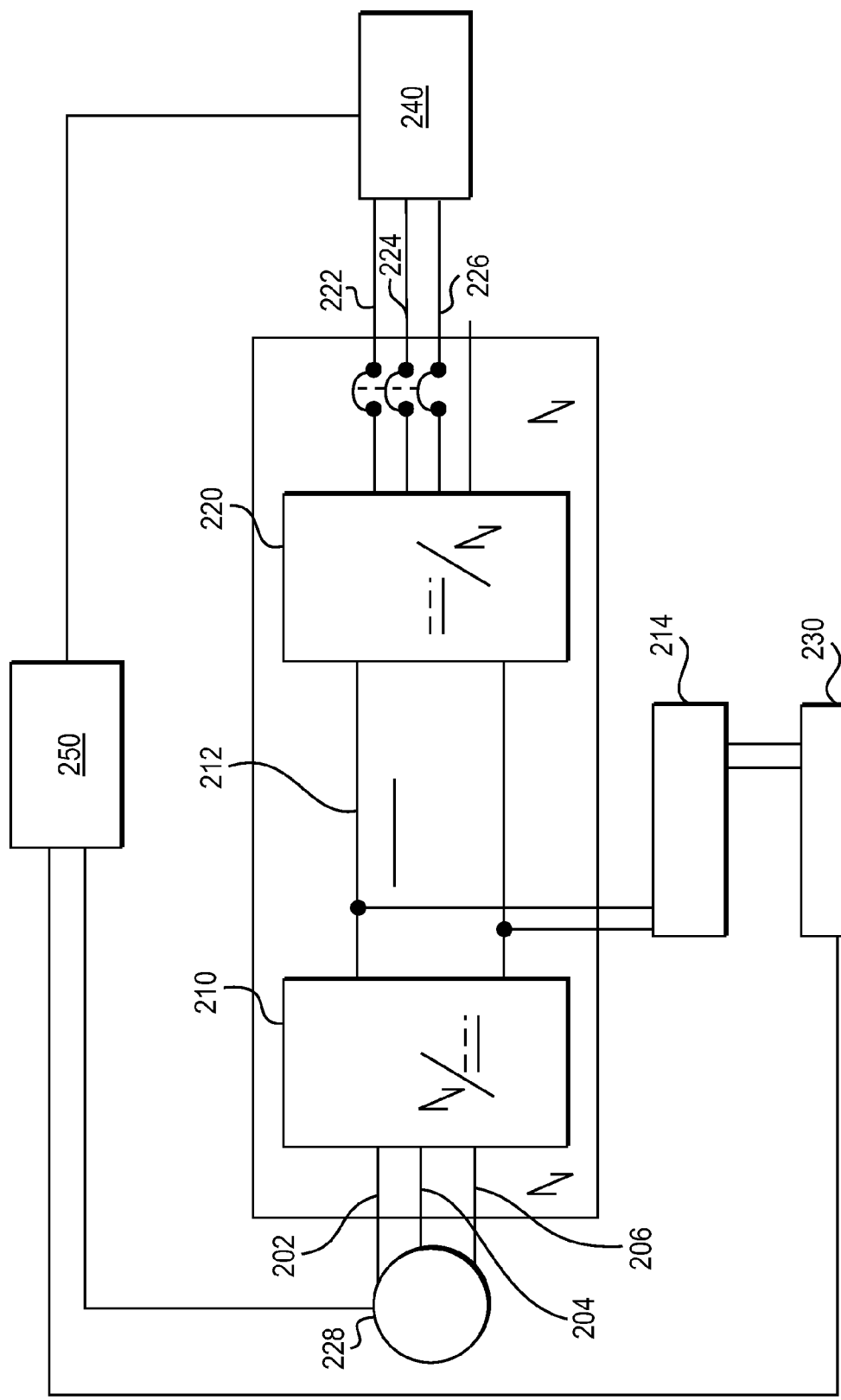
FIG. 2 is a schematic illustration of another exemplary disclosed turbine engine hybrid power supply.

As shown in FIG. 2, a turbine-generator 228 may provide three phase 202, 204, 206 alternating current (AC) to an AC-to-DC converter or rectifier 210, and the resulting direct current (DC) may be provided over a DC power bus 212 to a DC-to-AC inverter 220, which may output three-phase electric power having three alternating currents 222, 224, 226 to one or more motors 240. DC controller 214 may be configured to direct a portion of the DC from DC power bus 212 into electrical energy storage device 230 when the power required by the one or more motors 240 is less than the total power being generated by turbine-generator 228, or when power is received from one or more motors 240, such as during a dynamic braking mode. In various implementations, DC-to-AC inverter 220 may also embody a set of power electronics operable to convert AC power to DC power (operable as a converter or rectifier) in a dynamic braking mode, and operable to convert DC power to AC power (operable as an inverter) when providing power to one or more motors 240. More specifically, inverter 220 may be connected to receive power from and deliver power to DC power bus 212, and may embody any power electronics capable of operating as both an inverter and a rectifier. For example, inverter 220 may include any number of thyristors, insulated gate bipolar transistors (IGBTs), metal-oxide semiconductor field-effect transistors (MOSFETs), bipolar junction transistors (BJTs), controllers, resistors, capacitors, inductors, and diodes, configured to operate according to the present disclosure. Circuits provided may include, but are not limited to, switched-mode power supplies, diode bridge full-wave rectifiers, and H-bridge inverters. In one exemplary implementation, converter 210 may embody a three-phase converter with controllable frequency and/or voltage parameters such that a frequency and/or voltage of the AC power received by converter 210 may be controllably set, as is known in the art. When operating in a mode with AC power flowing from turbine-generator 228 into converter 210, converter 210 may receive AC power from turbine-generator 228 and supply DC power to DC power bus 212. Inverter 220 may convert the DC power to AC power, and deliver the AC power to one or more motors 240. When operating in a dynamic braking mode, or other mode where one or more of the motors 240 acts as a generator, inverter 220 may receive AC power from one or more motors 240, operate as a rectifier to convert the AC power to DC power, and deliver the DC power through DC power bus 212 to DC controller 214 and electrical energy storage device 230.

A system controller 250 may also be connected to turbine-generator 228, electrical energy storage device 230, and one or more motors 240. System controller 250 may be configured to make determinations on how to transfer power between turbine-generator 228, inertial energy storage embodied in the rotating components of turbine-generator 228, including any additional flywheel(s) that may be coupled to turbine-generator 228 to increase the inertial energy storage capacity, electrical energy storage device 230, and one or more electric motors 240. The one or more electric motors 240 may provide power for static or dynamic uses that may include, but are not limited to, power for building systems, traction power for a vehicle, or power for other uses. In various implementations of this disclosure, system controller 250 may be configured to provide signals to rapidly turn fuel 100% on or completely off to the turbine engine of turbine-generator set 228. By only running the turbine engine at 100% rated capacity or with fuel completely cut off, system controller 250 may ensure that the turbine engine is always running at high efficiency, and not operating under part-load conditions. Controller 250 may embody a single or multiple microprocessors that may form one or more modules for controlling various operations of the turbine engine hybrid power supply according to various implementations of this disclosure. Controller 250 may include fast switching capabilities such as may be provided by field programmable gate arrays (FPGA) to enable rapid on and off switching with an update rate that may be less than approximately 10 microseconds. This capability may be employed at the high rotational speeds experienced by a switched-reluctance-type generator used in turbine-generator 228.

Controller 250 may also be configured to provide anticipatory controls that take into consideration expected or known upcoming loads on the system based on acquired information such as the position of the system, maps of the conditions under which the system is being operated, or calculations or algorithms that determine anticipated loads from various inputs provided by sensors. System controller 250 may be configured to include one or more processors, databases, look-up tables, maps, and other sources of information relevant to energy management processes performed by system controller 250. Controller 250 may also be communicatively coupled over wired or wireless links (not shown) to other sources of network or non-network data, such as may be obtained from central control centers, wayside stations, dispatch centers, or from onboard sources such as a global positioning satellite receiver (GPS) or operator input. In various implementations that may include use of the turbine engine hybrid on a vehicle, controller 250 may be configured to determine present and anticipated vehicle position information via a position identification system such as a GPS. Controller 250 may use this position information to locate data in a database regarding present and/or anticipated terrain or track topographic and profile conditions that may be experienced by a vehicle having the turbine engine hybrid power supply of the present disclosure. Such information may include, for example, track or terrain grade, elevation (e.g., height above mean sea level), train track curve data, train tunnel information, and speed limit information. This database information could be provided by a variety of sources including: an onboard database associated with controller 250, a communication system such as a wireless communication system providing the information from a central source, manual operator input(s), via one or more wayside signaling devices, or a combination of such sources. Other vehicle information such as the size and weight of the vehicle, a power capacity associated with the turbine engine, efficiency ratings, present and anticipated speed, and present and anticipated electrical load may also be included in a database (or supplied in real or near real time) and used by controller 250. In various alternative implementations, controller 250 may be configured to determine energy storage and energy transfer requirements associated with the energy storage in a static fashion. For example, controller 250 may be preprogrammed with any of the above information, or could use look-up tables or maps based on past operating experience.

Controller 250 may use present and/or upcoming power demand information, along with vehicle status information, to determine power storage and power transfer requirements. Controller 250 may also determine possible energy storage opportunities based on the present and future likely power demand information. For example, based on terrain information, such as upcoming track characteristics information for a train, controller 250 may determine that it is more efficient to leave the turbine engine in a fuel cut-off mode and use up energy stored as inertial energy and/or electrical energy. Controller 250 may be configured to make this determination even though present energy demand is low, because a dynamic braking region is coming up (or because the train or other vehicle is behind schedule and is attempting to make up time). In this way, controller 250 may be configured to improve efficiency by accounting for the stored energy before a potential upcoming charging region is encountered. Controller 250 may be further configured to keep the fuel supply to the turbine engine turned off until both the inertial energy storage embodied in the rotational components of turbine-generator 228, and the electrical energy storage in electrical energy storage device 230 have dropped below set thresholds. In the case of inertial energy storage in the rotating components of turbine-generator 228, the set threshold may be a designated level or range of revolutions per minute (RPM), such as when a turbine engine that normally runs in the range from 40,000 RPM to 60,000 RPM has dropped below 48,000 RPM to 45,000 RPM. Similarly, the set threshold for electrical energy storage device 230 may be a lower charge level or range of charge levels below which electrical energy storage device 230 should be recharged.

In operation, controller 250 may be configured to determine power storage requirements and power transfer requirements. Electrical energy storage device 230 may store electrical energy in response to power storage requirements, and the rotating components of turbine-generator 228 may store inertial energy in response to power storage requirements. As explained above, electrical energy storage device 230 may allow for more gradual storage and transfer of energy resulting from excess electrical energy produced by the generator in turbine-generator 228. Inertial energy storage of the rotating components of turbine-generator 228 may allow for more rapid storage of excess energy and transfer of energy in situations where a power demand may require faster access to energy than may be available from electrical energy storage device 230. Controller 250 may also be configured to adjust requirements for the storage and transfer of energy based at least in part on the amount of energy available from turbine-generator 228 in excess of present and/or anticipated power demands. Controller 250 may be configured to receive signals from sensors such as acceleration sensors, throttle position sensors, air intake sensors, brake sensors, and fuel-air ratio sensors, as well as data from various data sources including look-up tables and maps, and determine whether a power demand requires shorter-term, faster access to energy or longer-term, more steady-state access to energy. Exemplary applications for rapid storage and transfer of energy may include sudden braking and acceleration conditions on a vehicle, and stopping and starting of the movement of an elevator in a building. Longer term, more steady-state applications may include providing power to a building's heating, ventilating, or air conditioning systems, and providing power to the traction components of a vehicle under constant velocity travel conditions or other steady-state conditions.

Controller 250 may be further configured to establish priorities or rules regarding the storage and transfer of energy. In various implementations, controller 250 may be configured to determine the power transfer requirement as a function of a demand for power. In certain implementations, controller 250 may be configured to provide a signal to fuel turbine-generator 228 only when both the inertial energy store has been depleted, as evidenced by a drop in rotational speed of turbine-generator 228 below a first threshold level, and the electrical energy stored in electrical energy storage device 230 has been depleted below a second threshold level. In other situations, depending on factors such as anticipated power demands, controller 250 may be configured to fuel turbine-generator 228 to full power even though one or more of the inertial energy storage and the electrical energy storage have not been depleted.

Figure 3:
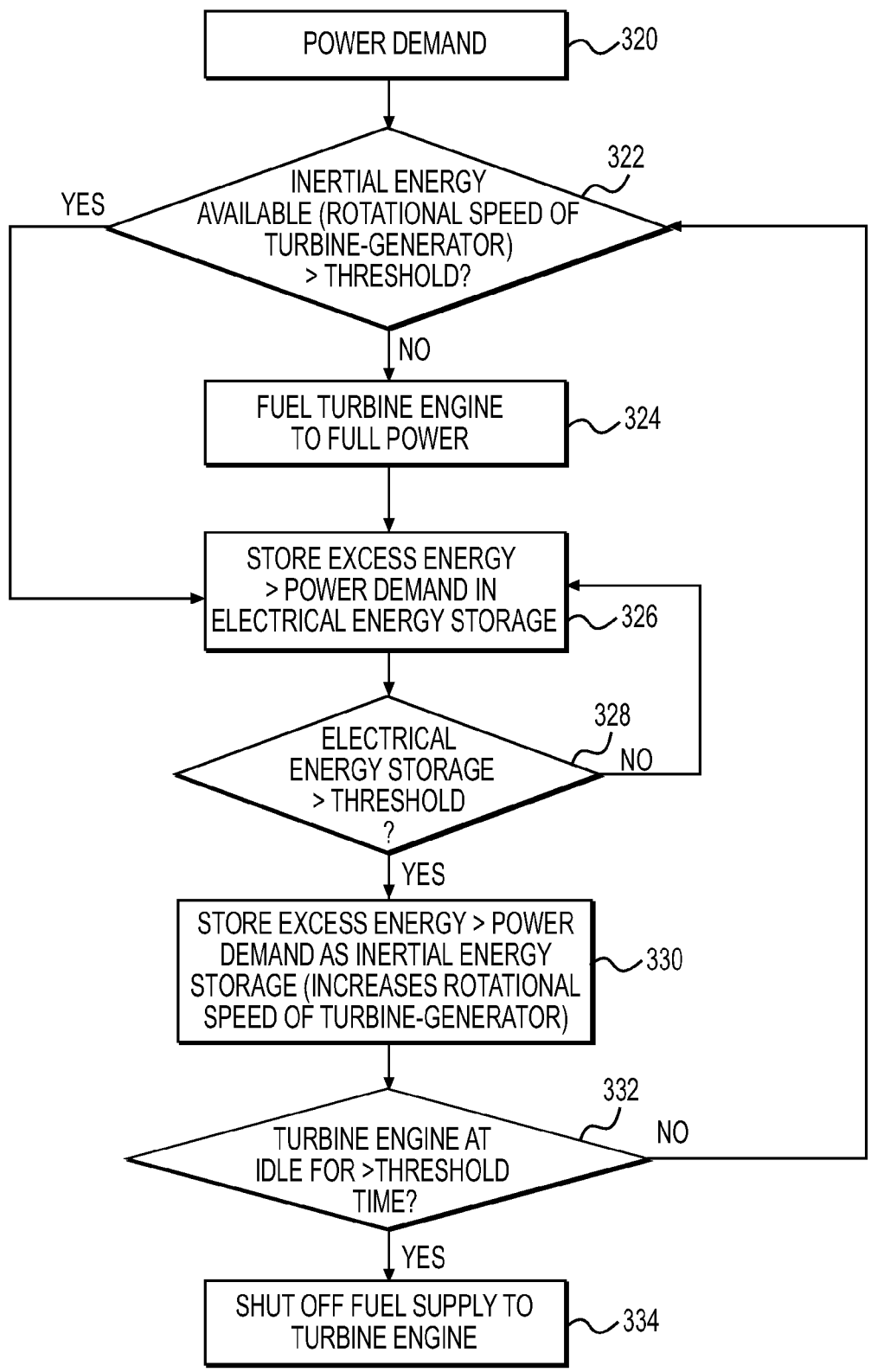
FIG. 3 is a flowchart depicting an exemplary disclosed power storage and transfer method that may be performed by the turbine engine hybrid power supplies of FIGS. 1 and 2.
Figure 4:
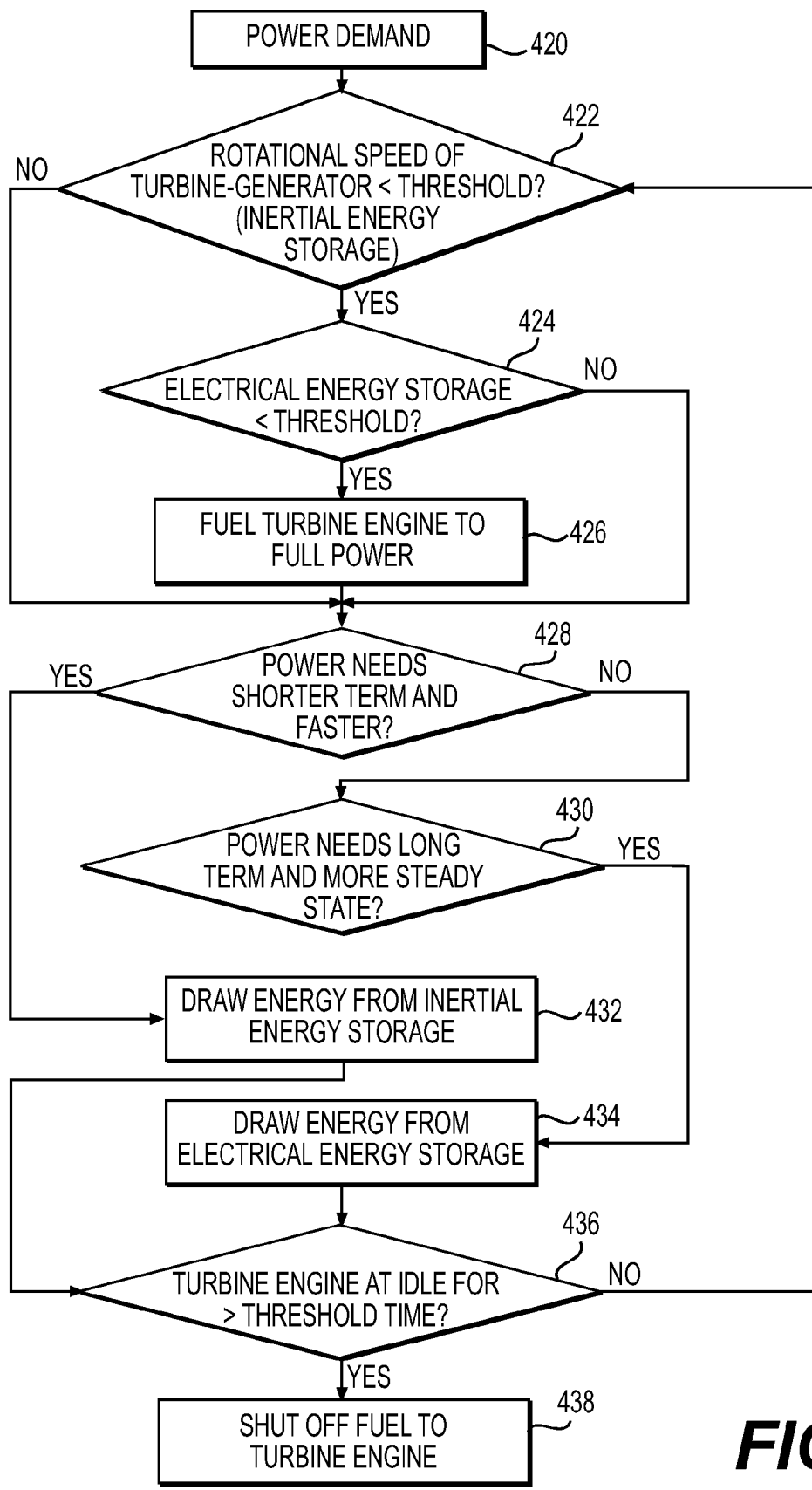
FIG. 4 is another flowchart depicting an exemplary disclosed power storage and transfer method that may be performed by the turbine engine hybrid power supplies of FIGS. 1 and 2.

FIGS. 3 and 4 illustrate steps of exemplary disclosed power storage and transfer methods that may be performed by controller 250 in conjunction with the turbine-generator discussed above. FIGS. 3 and 4 will be discussed in the following section in order to further illustrate the disclosed concepts.

INDUSTRIAL APPLICABILITY

The disclosed exemplary turbine engine hybrid power supply may provide improved fuel efficiency, reduced emissions, the ability to use a variety of fuels, and the ability to store energy available for shorter-term and faster demands for power, and longer-term, more steady-state demands for power. Significant fuel savings in particular may be achieved by controlling power transfer and storage such that a turbine engine of the system may only be operated at either full power with approximately 100% of rated fuel supply, or with the fuel completely cut off. The high rotational speeds of the turbine and generator provide significant storage of inertial energy, which can be stored rapidly, and is also available for power demands that may call for instant supply of energy. The addition of electrical energy storage means also provides greater capacity for longer-term, more steady-state energy storage, and the availability of more stored energy over a longer period of time than may be available from the inertial energy storage.

As shown in FIG. 3, a power demand signal may be received at Step: 320, with such a demand signal being generated, for example, by an acceleration signal received from a vehicle throttle sensor. In one implementation, controller 250 may make a determination at Step: 322 whether inertial energy is available to satisfy the power demand, with the inertial energy stored in the rotational components of turbine-generator 228. If the rotational speed of turbine-generator 228 is greater than a threshold level (Step: 322—Yes), then any excess energy greater than the power demand may be stored in electrical energy storage device 230 (Step: 326). In alternative implementations, excess energy at this point may be stored as inertial energy in the rotating components of turbine-generator 228, for example in situations where electrical energy storage device 230 is already at a full charge.

If inertial energy is not available upon a demand for power (Step: 322—No), as evidenced by the rotational speed of turbine-generator 228 being less than a threshold, controller 250 may turn on the turbine engine and fuel it to full rated power at Step: 324. One of ordinary skill in the art will recognize that the generator in turbine-generator 228 may act as a starter, and the electrical power needed to start turbine-generator 228 may be drawn from electrical energy storage device 230, or other external power sources. With turbine-generator 228 now operating at its full rated power, power in excess of the power demanded by one or more motors 240 or other devices using the power may be stored in electrical energy storage device 230 at Step: 326.

At Step: 328 a determination may be made as to whether the electrical energy stored in electrical energy storage device 230 has exceeded a threshold, and if the answer is yes, excess energy greater than any power demand may be stored as inertial energy, as evidenced by an increase in the rotational speed of turbine-generator 228 at Step: 330. If electrical energy stored in electrical energy storage device 230 has not exceeded the threshold (Step: 328—No), then excess energy greater than any power demand may continue to be stored as electrical energy in electrical energy storage device 230.

When all power demands are being satisfied by existing energy stores, either from electrical energy storage device 230, or from the inertial energy storage of rotating components of turbine-generator 228, the turbine engine may enter an idling state. At Step: 332 a determination may be made whether the turbine engine has been idling for more than a threshold period of time. If the answer is yes, the fuel supply to the turbine engine may be turned completely off at Step: 334. Before that threshold period of time has passed (Step: 332—No), the turbine engine may remain fully fueled in order to build back up the rotational speed of turbine-generator 228 and store excess energy as inertial energy. By only operating the turbine engine of turbine-generator 228 at either full power or no power, part-power operating modes at less than the maximum operating efficiency of the turbine engine may be avoided.

In an embodiment at least partially illustrated by the steps of FIG. 4, the energy management processes performed by controller 250 may include distinguishing between power demands that are shorter and faster, and power demands that require power over a longer period of time and/or under more of a steady-state. A power demand signal may be received at Step: 420. Controller 250 may determine whether the available inertial energy storage is sufficient to meet the power demand by checking whether the rotational speed of turbine-generator 228 is less than a threshold level at Step: 422. If the rotational speed of turbine-generator 228 is less than a threshold (Step: 422—Yes), then controller 250 may check whether the electrical energy storage is also less than a threshold at Step: 424. If both the inertial energy storage and the electrical energy storage are less than respective thresholds (Step: 422—Yes, and Step: 424—Yes) than controller 250 may start the turbine engine and fuel it to 100% rated power at Step: 426.

If inertial energy is available, and the rotational speed of turbine-generator is not less than a threshold (Step: 422—No) controller 250 may next determine whether the power needs are shorter-term and faster (Step: 428—Yes) or longer-term and more steady state (Step: 430—Yes). Likewise, if electrical energy is available in electrical energy storage (Step: 424—No) controller 250 may also next determine whether the power needs are shorter-term and faster (Step: 428—Yes) or longer-term and more steady state (Step: 430—Yes). If the determination is that the power needs are shorter-term and faster, energy may be drawn from inertial energy storage at Step: 432. If the determination is that the power needs are longer-term and more steady state, energy may be drawn from electrical energy storage device 230 at Step: 434. As with the implementation illustrated in FIG. 3, an additional determination may be made at Step: 436 whether the turbine engine has been idling for greater than a threshold period of time, and if the answer is yes, the fuel to the turbine engine may be shut off completely at Step: 438. If the turbine engine has not been idling for greater than the threshold period of time (Step: 436—No), then turbine-generator 228 may continue to receive fuel and the rotational speed of turbine-generator 228 may continue to store inertial energy.

By distinguishing between shorter-term power needs and longer-term power needs, the turbine engine hybrid power supply according to various implementations of the present disclosure achieves a high level of versatility in meeting different power requirements. The ability to rapidly store excess energy as inertial energy and provide for longer-term, more steady state energy storage in an electrical energy storage device also avoids any wasting of excess power.

It will be apparent to those skilled in the art that various modifications and variations can be made to the disclosed turbine engine hybrid power supply without departing from the scope of the disclosure. Other embodiments of the power supply will be apparent to those skilled in the art from consideration of the specification and practice of the methods disclosed herein. It is intended that the specification and examples be considered as exemplary only, with a true scope of the disclosure being indicated by the following claims and their equivalents.

What is claimed is:

1. A hybrid power supply, comprising:
   a turbine engine, the turbine engine including one or more rotating components;
   a drive shaft;
   a generator connected in series through the drive shaft with the turbine engine, the generator including one or more rotating components;

an electrical energy storage device connected to receive electrical energy produced by the generator;
a controller connected to the turbine engine, the generator, and the electrical energy storage device, the controller configured to:
receive a power demand signal;
determine a power level in the electrical energy storage device;
determine available inertial energy stored at least in the rotating components of the turbine engine and the generator;
determine whether the power demand signal is indicative of a power demand that requires faster access to energy over a shorter time period or a power demand that requires slower access to energy and a more steady state demand for energy over a longer time period; and
provide one or more control signals based on one or more of the power demand signal, the power level in the electrical energy storage device, and the available inertial energy, to selectively control the performance of one or more of the functions of:
selectively powering the turbine engine to full power;
selectively turning off all fuel to the turbine engine;
selectively directing excess electrical energy from the generator to the electrical energy storage device; and
selectively storing excess energy as inertial energy.

2. The hybrid power supply of claim 1, wherein the controller is configured to provide a control signal to selectively direct excess electrical energy from the generator to the electrical energy storage device when the determined power level in the electrical energy storage device drops below a first threshold.

3. The hybrid power supply of claim 1, wherein the controller is configured to provide a control signal to selectively store excess energy as inertial energy when a speed of rotation of the rotating components of the turbine engine and the generator drops below a second threshold.

4. The hybrid power supply of claim 3, wherein the controller is configured to provide a control signal to power the turbine engine to full power from a fuel cut-off mode when the speed of rotation of the rotating components of the turbine engine and the generator drops below the second threshold.

5. The hybrid power supply of claim 1, wherein the controller is configured to provide a control signal to power the turbine engine to full power from a fuel cut-off mode when the speed of rotation of the rotating components of the turbine engine and the generator drops below a second threshold and the determined power level in the electrical energy storage device drops below a first threshold.

6. The hybrid power supply of claim 1, wherein the controller is configured to provide a control signal to turn off all fuel to the turbine engine when controller detects that the turbine engine has been idling for more than a selected period of time.

7. The hybrid power supply of claim 1, wherein the controller is further configured to provide a control signal to power the turbine engine to full power from a fuel cut-off mode and to prioritize storing excess energy as inertial energy before directing excess electrical energy from the generator to the electrical energy storage device.

8. The hybrid power supply of claim 1, wherein the electrical energy storage device includes one or more lithium-ion batteries.

9. The hybrid power supply of claim 1, wherein the controller is further configured to provide a control signal to draw energy to meet the power demand signal from the stored inertial energy when faster access to energy is required.

10. The hybrid power supply of claim 1, wherein the controller is further configured to provide a control signal to draw energy to meet the power demand signal from the stored electrical energy when slower and more steady state access to energy is required.

11. A method of controlling a hybrid machine equipped with a turbine engine, a generator connected in series with the turbine engine, an electrical energy storage device, and a motor drivingly connected to a power output component for the hybrid machine, the method comprising:
receiving a power demand signal;
determining a power level in the electrical energy storage device;
determining available inertial energy stored at least in rotating components of the turbine engine and the generator;
determining whether the power demand signal is indicative of a power demand that requires faster access to energy over a shorter time period or slower access to energy and a more steady state demand for energy over a longer time period; and
providing one or more control signals based on one or more of the power demand signal, the power level in the electrical energy storage device, and the available inertial energy, to selectively control the performance of one or more of the functions of:
selectively powering the turbine engine to full power;
selectively turning off all fuel to the turbine engine;
selectively storing excess energy as electrical energy by directing excess electrical energy from the generator to the electrical energy storage device; and
selectively storing excess energy as inertial energy.

12. The method according to claim 11, wherein selectively storing excess energy as electrical energy includes providing a control signal to selectively direct excess electrical energy from the generator to the electrical energy storage device when a power level in the electrical energy storage device drops below a first threshold.

13. The method according to claim 11, wherein selectively storing excess energy as inertial energy includes increasing the speed of rotation of the rotating components of the turbine engine and the generator when the speed of rotation of the rotating components drops below a second threshold.

14. The method according to claim 13, further including powering the turbine engine to full power from a fuel cut-off mode when the speed of rotation of the rotating components of the turbine engine and the generator drops below the second threshold.

15. The method of claim 11, further including powering the turbine engine to full power from a fuel cut-off mode when the speed of rotation of the rotating components of the turbine engine and the generator drops below a second threshold and the determined power level in the electrical energy storage device drops below a first threshold.

16. The method of claim 11, further including turning off all fuel to the turbine engine when the controller detects that the turbine engine has been idling for more than a selected period of time.

17. The method of claim 11, further including:
powering the turbine engine to full power from a fuel cut-off mode; and
prioritizing storing excess energy as inertial energy before directing excess electrical energy from the generator to the electrical energy storage device.

18. The method of claim 11, wherein a determination that the power demand signal is indicative of a power demand that requires faster access to energy over a shorter time period results in drawing energy to meet the power demand signal from the inertial energy.

19. The method of claim 11, wherein a determination that the power demand signal is indicative of a power demand that requires slower access to energy and a more steady state demand for energy over a longer time period results in drawing energy to meet the power demand signal from the electrical energy stored in the electrical energy storage device.

20. A machine comprising:
a hybrid power supply, the hybrid power supply including:
  a turbine engine, the turbine engine including one or more rotating components;
  a drive shaft;
  a generator connected in series through the drive shaft with the turbine engine, the generator including one or more rotating components;
  an electrical energy storage device connected to receive electrical energy produced by the generator; and
  a controller connected to the turbine engine, the generator, and the electrical energy storage device, the controller configured to:
    receive a power demand signal;
    determine a power level in the electrical energy storage device;
    determine available inertial energy stored at least in the rotating components of the turbine engine and the generator;
    determine whether the power demand signal is indicative of a power demand that requires faster access to energy over a shorter time period or a power demand that requires slower access to energy and a more steady state demand for energy over a longer time period; and
    provide one or more control signals based on one or more of the power demand signal, the power level in the electrical energy storage device, and the available inertial energy, to selectively control the performance of one or more of the functions of:
      selectively powering the turbine engine to full power;
      selectively turning off all fuel to the turbine engine;
      selectively directing excess electrical energy from the generator to the electrical energy storage device; and
      selectively storing excess energy as inertial energy; and
one or more motors drivingly coupled to one or more power output components, the one or more motors configured to receive or supply electrical energy from or to the generator and the electrical energy storage device.

* * * * *